United States Patent [19]

Easter et al.

[11] 4,061,073

[45] Dec. 6, 1977

[54] CONTROLLABLY DEFORMABLE FASTENER ASSEMBLY

[75] Inventors: Rollen G. Easter, Tremont; James A. Hooker, Peoria, both of Ill.

[73] Assignee: Caterpillar Tractor Co., Peoria, Ill.

[21] Appl. No.: 763,740

[22] Filed: Jan. 28, 1977

[51] Int. Cl.² .................. F16B 31/02; B62D 25/06
[52] U.S. Cl. ................................ 85/62; 85/1 T; 85/50 R; 280/756
[58] Field of Search ............. 85/1 T, 32 T, 61, 62, 85/50 R; 403/2, 408; 280/756; 296/102

[56] References Cited

U.S. PATENT DOCUMENTS

| 3,036,858 | 5/1962 | Fingerut | 280/756 |
|---|---|---|---|
| 3,323,403 | 6/1967 | Waisman | 85/62 |
| 3,560,019 | 2/1971 | Moore | 280/756 |
| 3,791,668 | 2/1974 | Adams | 280/756 |
| 3,890,876 | 6/1975 | Dahl | 85/62 |
| 3,918,740 | 11/1975 | Notestine | 280/756 |
| 3,990,738 | 11/1976 | Kolinger et al. | 280/756 |

FOREIGN PATENT DOCUMENTS

| 1,630,699 | 8/1971 | Germany | 280/756 |
|---|---|---|---|
| 900,231 | 7/1962 | United Kingdom | 85/62 |
| 824,012 | 11/1959 | United Kingdom | 85/32 T |
| 774,574 | 5/1957 | United Kingdom | 85/62 |
| 857,495 | 12/1960 | United Kingdom | 85/32 T |

*Primary Examiner*—Marion Parsons, Jr.
*Attorney, Agent, or Firm*—Charles E. Lanchantin, Jr.

[57] ABSTRACT

A controllably deformable fastener assembly has a fastener, clamping means, and a crushable element. The fastener has a threaded shank portion, a head portion and a shoulder portion on the head portion. The shank portion is of a material having a preselected tensile yield load. The clamping means is provided for screw threadably receiving the shank portion of the fastener, including a shoulder portion that is movable towards the shoulder portion of the fastener for securing a first member to a second member. The crushable element is disposed therebetween and is of a material that is controllably plastically deformable at a preselected load which is less than the preselected tensile yield load of the shank portion of the fastener.

16 Claims, 3 Drawing Figures

U.S. Patent     Dec. 6, 1977     4,061,073
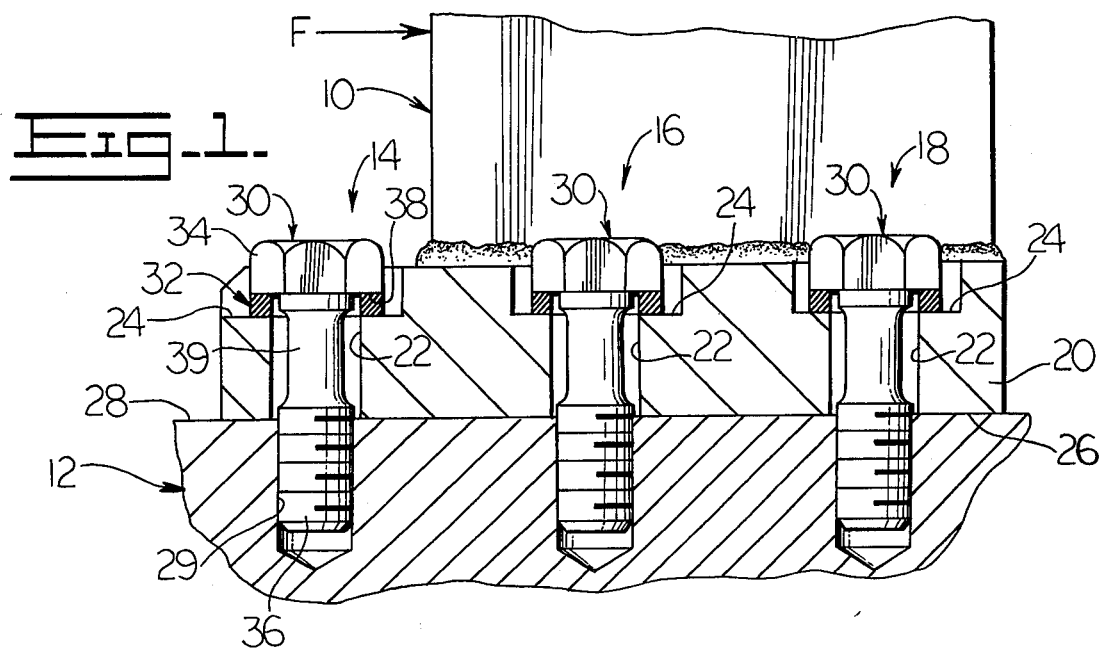
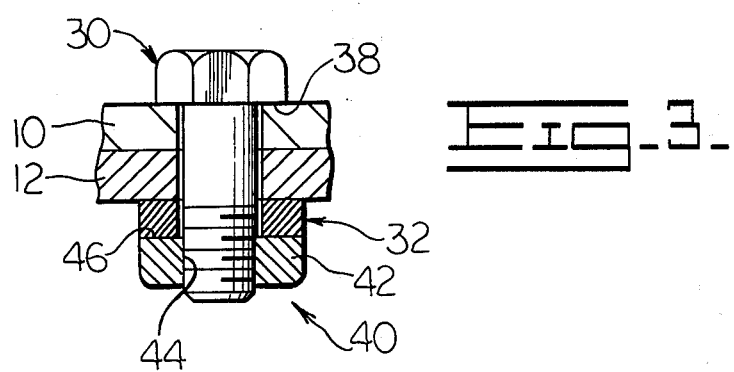
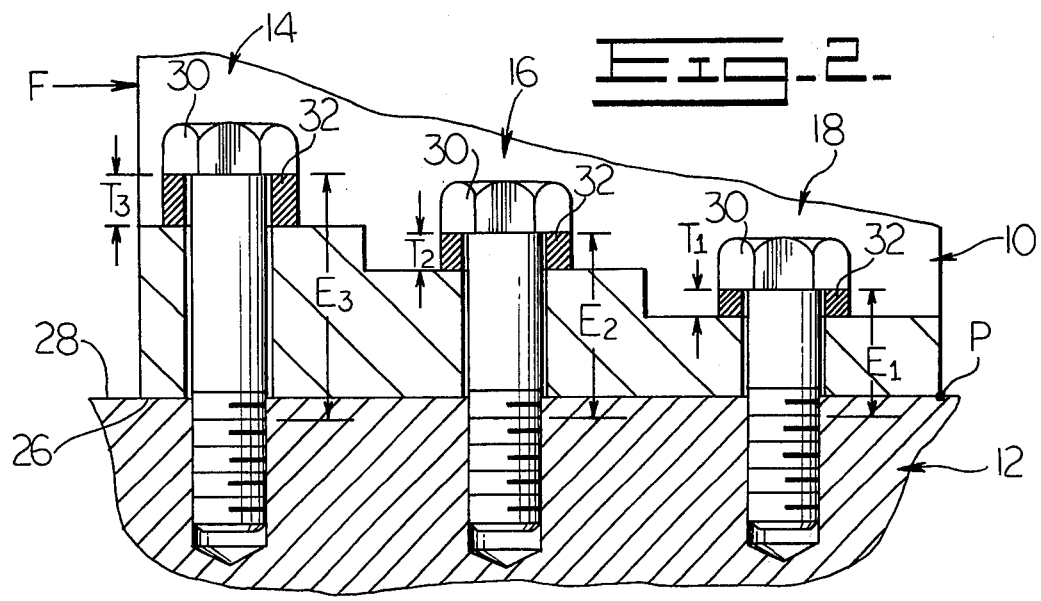

CONTROLLABLY DEFORMABLE FASTENER ASSEMBLY

BACKGROUND OF THE INVENTION

The present invention is related to a fastener assembly for securing two or more members together, and more particularly to a fastener assembly that is plastically deformable at a preselected load to provide a maximum load limit therefor without attendant failure. A plurality of such fastener assemblies may be used to provide a progressively loadable mounting joint for more positively securing a workpiece to a frame.

Conventional rollover protection structures for vehicles include sturdy beams which extend over the head of the operator and two or more depending legs which are usually removably secured to the frame by a plurality of fasteners. In the typical case the frame has threaded apertures formed therein, and a plurality of bolts extend through flanges on the legs and are screw threadably received in the apertures. When the rollover protection structure is subjected to relatively instantaneous loads of high magnitude, as would be the case in the event of an accidental rollover of the vehicle, the individual bolts holding the legs to the frame are subject to progressive failure. Since the bolts are often aligned in rows, the mounting joint tends to open at one location subjecting the leading one of the bolts to a greater stress than the others. As a result, such heavily stressed bolt may reach its tensile yield load and fail by breakage before the remaining bolts can pick up and share the remaining load. This can cause the other bolts to fail in a sequentially following manner. Heretofore, in an attempt to solve this problem such mounting joints have used an excessive number of bolts or larger bolts than necessary, or have been completely redesigned to a more costly form of construction.

SUMMARY OF THE INVENTION

The present invention is directed to overcoming one or more of the problems as set forth above.

According to the present invention, a controllably deformable fastener assembly includes a fastener with a threaded shank portion, a head portion, and a shoulder portion on the head portion, with the shank portion being of a material having a preselected tensile yield load. Means is provided for screw threadably receiving the shank portion of the fastener, including a shoulder portion that is movable towards the shoulder portion of the fastener to enable two or more members to be clamped together. Advantageously, a crushable element is disposed therebetween, with the crushable element being of an elastic-plastic material which can be controllably plastically deformed at a preselected load which is less than the preselected tensile yield load of the fastener.

BRIEF DESCRIPTION OF THE DRAWINGS

FIG. 1 is a fragmentary vertical sectional view of a mounting joint arrangement including a rollover protection structure leg which is connected to a frame by a plurality of fastener assemblies in accordance with the present invention.

FIG. 2 is a fragmentary vertical sectional view of an alternate embodiment mounting joint arrangement utilizing a plurality of fastener assemblies in accordance with the present invention and which may be compared with FIG. 1.

FIG. 3 is a fragmentary sectional view of a second alternate embodiment mounting joint arrangement showing only a single fastener assembly constructed in accordance with the present invention.

DETAILED DESCRIPTION OF THE INVENTION

A rollover protection structure leg or first member 10 is shown in FIG. 1 as being secured to a vehicle frame or second member 12 as by a plurality of controllably deformable fastener assemblies 14, 16 and 18 constructed in accordance with the present invention and arranged generally in equally spaced apart relation in a longitudinally oriented row. It is to be appreciated that while only one row of fastener assemblies is illustrated, another row thereof would likely be used on the opposite side of the leg for symmetrical loading purposes. Also, while not shown, two or more legs are usually used for supporting the overhead beams which serve to protect the operator of the vehicle. It is believed, however, that the schematically illustrated embodiments will suffice for a complete understanding of the present invention.

As is clearly shown, the leg 10 has a relatively thick steel mounting flange 20 thereon with a plurality of cylindrical passages 22 therethrough opening outwardly on a corresponding plurality of recessed seats 24 and on a leg mounting surface 26.

The relatively rigid steel frame 12, to which the leg 10 is secured, includes a planar mounting surface or shoulder portion 28 and a plurality of threaded apertures 29 opening outwardly on the mounting surface.

Since each of the deformable fastener assemblies 14, 16 and 18 is identical in the instant example of FIG. 1, only one needs to be described to gain an understanding of the present invention. Accordingly, the first fastener assembly 14 has a screw threaded fastener or steel bolt 30 and an annular crushable element or metal washer 32. The steel bolt includes a hex head portion 34, a threaded shank portion 36 which is received in the aperture 29, and an annular inwardly facing shoulder portion 38 defined on the head portion. Preferably, the shank portion of the bolt has a reduced diameter cylindrical neck 39 to permit precise control of the stress/strain characteristics of the bolt generally within the elastic region when under tensile loads. Preferably also, each of these bolts has physical characteristics similar to an SAE grade 8 medium carbon steel bolt; for example, having an effective yield strength of approximately 9,140 Kg per sq. cm. (130,000 psi) and a relatively high degree of hardness of approximately 33 to 39 on the Rockwell C scale.

In accordance with one of the main features of the invention, the crushable metal washer 32 is made from an elastic-plastic metal material which when subject to increasing compressive loads experiences a load/strain relationship embodying an initial elastic region and a final plastic region with a preselected load changeover point defined substantially therebetween. In the elastic region the ratio of load to strain is reasonably constant and often approaches a straight line relationship. However, a load changeover point is reached where a further increase in load will show a sharp departure from such straight line and the material thereafter continues to yield indefinitely at a markedly flatter rate and in a plastic manner. For example, the instant crushable washer is preferably of low or medium carbon steel (for example, 0.20 to 0.35 percent carbon by weight) of fine or homogeneous grain microstructure which has been normalized or quenched and tempered in order to obtain the desired elastic-plastic compression parameters. The preselected load changeover point of the crushable washer is preferably established in a relatively narrow range, for example approximately 3,160 Kg per sq. cm. (45,000 psi) nominal yield. The washer is also relatively soft, being preferably made from a high strength structural steel which has been normalized to a hardness level of approximately 5.0 to 5.1 mm on the Brinell B scale to provide the predictable load limit properties.

In operation, the crushable metal washer 32 is circumscribingly disposed about the shank portion 36 of the bolt 30 and is loaded in compression between the shoulder portion 38 of the bolt's head portion 34 and the seat 24 of the mounting flange 20. As is the usual case, all of the bolts securing the leg 10 to the frame 12 are tightened to preselected torque levels by screw threadably inserting them within their respective apertures 29. Thereafter, in the event of an accident, the leg may be subjected to a relatively high and instantaneous impact force such as is schematically illustrated by the arrow identified by the letter F. In such event the first fastener assembly 14 would experience the highest loading as a result of the force tending to separate the facing mounting surfaces 26 and 28 thereat. Of course, the second and third fastener assemblies 16 and 18 would simultaneously experience progressively less loading because the pivot action tending to rock the leg in a clockwise direction when viewing the drawing is closer to the third fastener assembly. Initially, then, the spacing between the mounting surfaces at the first fastener assembly would increase as the shank portion 36 of the first bolt elongates elastically and as the washer deforms elastically in compression within its elastic region. However, upon reaching the preselected load changeover point of the washer it crushes plastically thereafter, so that even though the flange may continue to bend and separate from the frame thereat the load on the shank portion of the bolt reaches a plateau or a maximum load limit. In this manner the physical characteristics of the washer are tailored to utilize most of the strength of the bolt while avoiding the failure thereof. At the same time, both the second and third fastener assemblies are picking up in a progressively following manner significantly large portions of the loading caused by the impact force F.

Thus, the elastic-plastic crushable washer assembly of the present invention contrasts sharply to the action of a conventional washer arrangement, which may at first glance appear to be the same, wherein the washer is purposely so hard that it does not crush. Prior washers have been purposely made to not reach the point of plastic deformation in order to assure retention of a high torque load on the bolt. As a result, the most heavily loaded prior art bolt will immediately experience loads beyond its tensile yield point and before the second bolt in the row can assume a proportionately large enough share of the forces. Upon breakage of the first bolt, the second bolt will experience such a marked increase in load that it too will fail. Such sequential failure of the row of bolts is substantially eliminated, or at the very least greatly minimized, with the present invention.

Referring now to FIG. 2, an alternate embodiment is shown wherein similar reference numerals have been applied in a manner corresponding to those elements described above. In this example the effective length E for each of the bolts 30 is roughly decreasingly proportioned as a function of its distance away from the first fastener assembly 14 which experiences the highest impact forces thereon, or in other words is increasingly proportioned as a function of the bolts distance from the pivot joint P of the leg 10 as it tends to rock in a clockwise manner about the frame 12. Thus, with any opening between the mounting surfaces 26 and 28 resulting from the impact force F, the unit strain on the first bolt 30 through the effective length $E_3$ is considerably less than what it would be if an effective bolt length of either $E_2$ or $E_1$ were used. This embodiment also teaches that the crushable washers 32 may also be varied in thickness T as a generally proportioned function of its distance from the first fastener assembly or the pivot joint P. Such proportioned dimensional control of the bolts and/or the washers relative to any predictable longitudinal force will make more uniform the load distribution on the individual fastener assemblies in the row, and will result in a mounting joint with greatly increased capacity.

A second alternate embodiment is shown in FIG. 3, wherein a fastener assembly 40 of somewhat different construction is utilized. In such embodiment a conventional hard steel nut 42 having a threaded aperture 44 centrally therethrough and a shoulder portion 46 is used with the bolt 30 and the crushable washer 32 to clamp the members 10 and 12 together. If desired, the crushable washer and nut may be integrally secured together to provide a unitized construction for ease of assembly. Here also, any forces tending to separate the clamped members will be resisted by the elastic elongation of the bolt and the elastic compression of the washer until the preselected load changeover point is reached in the washer. Thereafter, the washer will fail plastically to prevent the load upon the bolt from rising over the preselected maximum value.

In each of the embodiments described above the preselected load changeover point of the washer 32 is established at a value which is less than the preselected tensile yield load of the bolt so that more effective use of the bolt's strength can be made. Moreover, the washers load changeover point is high enough to assure positive retention of the fastener assembly under standard bolt tightening or torquing procedures.

Other aspects, objects, and advantages of this invention can be obtained from a study of the drawings, the disclosure, and the appended claims.

The embodiments of the invention in which an exclusive property or privilege is claimed are defined as follows:

1. A controllably deformable fastener assembly, for securing a first member to a second member, comprising:

a fastener having a threaded shank portion, a head portion, and a shoulder portion on the head portion, said shank portion being of a material having a preselected tensile yield load;

clamping means including a shoulder portion for screw threadably receiving the shank portion of the fastener, moving the shoulder portion towards the shoulder portion of the fastener, and clamping the first and second members together; and, crushable element means disposed between one of the shoulder portions and one of the members for maintaining elastic deformation in response to threaded tightening of said fastener and controlled plastic deformation only in response to a force tending to separate said members at a preselected load which is less than said preselected tensile yield load of the shank portion of the fastener.

2. The fastener assembly of claim 1 wherein said crushable element means is an annular metal washer which is disposed about the shank portion of the fastener.

3. The fastener assembly of claim 2 wherein said fastener is a bolt and said clamping means is a nut having a threaded aperture therethrough, said nut providing said shoulder portion, and said shank portion of the fastener having threads mateable with the threaded aperture of the nut.

4. The fastener assembly of claim 2 wherein said clamping means for receiving the shank portion of the fastener is a threaded aperture formed in the second member.

5. The fastener assembly of claim 4 wherein said fastener is a bolt and said first member has a passage therethrough, said bolt extending through said passage and being received in said threaded aperture of the second member.

6. A controllably deformable fastener assembly, for securing a first member having a passage therethrough to a second member having a threaded aperture therein, comprising:
   a fastener having a threaded shank portion, a head portion, and a shoulder portion on the head portion, said shank portion being of a material having a preselected tensile yield load; and
   a crushable washer mounted about the shank portion of the fastener between the shoulder portion of the fastener and the first member, said shank portion extending through the passage in the first member and into threaded engagement with the aperture of the second member, said washer being of a construction and material sufficient for maintaining elastic deformation in response to threaded tightening of said fastener to a preselected value sufficient to positively secure said first and second members together, and for maintaining controlled plastic deformation only in response to a preselected separating force between said first and second members at a preselected load which is less than said corresponding preselected tensile yield load of the shank portion of the fastener.

7. The fastener assembly of claim 6 wherein the fastener is a steel bolt.

8. The fastener assembly of claim 7 wherein the washer is a steel washer.

9. The fastener assembly of claim 8 wherein the shank portion of the bolt has a threaded portion and a cylindrical neck portion, said neck portion being of reduced diameter relative to said threaded portion.

10. A mounting joint structure comprising:
    a frame having a mounting surface and a plurality of spaced apart threaded apertures opening on the mounting surface;
    a workpiece having a mounting surface contacting the mounting surface of the frame;
    a plurality of fasteners each having a shoulder portion, a threaded shank portion, and a preselected tensile yield load, each of the shank portions being screw threadably received within a respective one of said apertures for loadably clamping the workpiece to the frame through the respective shoulder portions of the fasteners, and defining a first one of the fasteners which is most heavily loaded as a result of a force on the workpiece; and
    a crushable element disposed between the shoulder portion of said most heavily loaded fastener and the workpiece, said crushable element being of a construction and material sufficient for maintaining elastic deformation in response to screw threaded tightening of said fasteners and for maintaining controlled plastic yielding only in response to a preselected separating force upon said workpiece at a preselected load which is less than said preselected tensile yield load of the shank portion of the most heavily loaded fastener.

11. The mounting joint structure of claim 10 wherein the workpiece is a leg of a rollover protection structure and the frame is a relatively rigid frame member of a vehicle.

12. The mounting joint structure of claim 10 wherein the shank portion of each of the fasteners has an effective length which varies in a gradually decreasing manner in generally direct proportion to the distance of each fastener away from said first fastener.

13. The mounting joint structure of claim 10 wherein each of the spaced apart fasteners utilizes a crushable element therewith, with each crushable element being of a gradually reduced thickness in generally direct proportion to its distance away from said first fastener.

14. The mounting joint of claim 10 wherein the material of the crushable element is steel, with the steel having approximately 0.20 to 0.35 percent carbon by weight.

15. The mounting joint of claim 10 wherein the crushable element is a steel washer having a hardness of approximately 5 on the Brinell B scale.

16. The mounting joint of claim 15 wherein said washer controllably plastically yields at a nominal yield point of approximately 3,160 K per sq. cm. (45,000 psi).

* * * * *